(12) United States Patent
Al-Nakhli et al.

(10) Patent No.: US 11,168,553 B2
(45) Date of Patent: Nov. 9, 2021

(54) METHODS FOR RECOVERING PETROLEUM BY REDUCING GEOLOGICAL FORMATION BREAK-DOWN PRESSURES

(71) Applicant: Saudi Arabian Oil Company, Dhahran (SA)

(72) Inventors: Ayman R. Al-Nakhli, Dammam (SA); Waheed Syed Arshad, Dhahran (SA); Guadalupe Adrian Buenrostro Mendoza, Udailiyah (SA)

(73) Assignee: Saudi Arabian Oil Company, Dhahran (SA)

( * ) Notice: Subject to any disclaimer, the term of this patent is extended or adjusted under 35 U.S.C. 154(b) by 138 days.

(21) Appl. No.: 16/405,527

(22) Filed: May 7, 2019

(65) Prior Publication Data

US 2020/0355052 A1    Nov. 12, 2020

(51) Int. Cl.
| | |
|---|---|
| *E21B 43/26* | (2006.01) |
| *C09K 8/592* | (2006.01) |
| *E21B 43/24* | (2006.01) |

(52) U.S. Cl.
CPC .......... *E21B 43/2405* (2013.01); *C09K 8/592* (2013.01); *E21B 43/26* (2013.01)

(58) Field of Classification Search
None
See application file for complete search history.

(56) References Cited

U.S. PATENT DOCUMENTS

| | | | |
|---|---|---|---|
| 4,330,037 A | 5/1982 | Richardson et al. | |
| 4,846,277 A | 7/1989 | Khalil et al. | |
| 5,183,581 A | 2/1993 | Khalil et al. | |
| 9,488,042 B2 | 11/2016 | Al-Nakhli et al. | |
| 9,644,460 B2 | 5/2017 | Bell et al. | |
| 9,657,552 B2 | 5/2017 | Choudhary et al. | |
| 9,951,265 B2 | 4/2018 | Almutairi | |
| 9,963,631 B2 | 5/2018 | Al-Nakhli et al. | |
| 10,030,492 B2 | 7/2018 | Al-Nakhli et al. | |
| 10,087,736 B1 | 10/2018 | Al-Mulhem | |
| 2010/0132946 A1 | 6/2010 | Bell et al. | |
| 2013/0126169 A1 | 5/2013 | Al-Nakhli et al. | |

(Continued)

FOREIGN PATENT DOCUMENTS

| | | |
|---|---|---|
| CA | 2892343 A1 | 11/2015 |
| CN | 104402659 A | 3/2015 |

(Continued)

OTHER PUBLICATIONS

Al-Nakhli et al., "Chemically-Induced Pressure Pulse to Increase Stimulated Reservoir Volume in Unconventional Resevoirs", Unconventional Resources Technology Conference, Aug. 25-27, 2014, URTeC: 1922369.

(Continued)

*Primary Examiner* — Charles R Nold
(74) *Attorney, Agent, or Firm* — Dinsmore & Shohl LLP (57) ABSTRACT

Petroleum may be recovered from a sub-surface reservoir by reducing the break-down pressure of a geological formation from an original break-down pressure to a reduced break-down pressure by exothermically reacting one or more reaction components in a carrier fluid adjacent to or within the geological formation, and forming fractures in the geological formation by hydraulic fracturing the geological formation.

17 Claims, 8 Drawing Sheets

(56) References Cited

U.S. PATENT DOCUMENTS

| | | | |
|---|---|---|---|
| 2014/0144632 A1 | 5/2014 | Zavolzhski et al. | |
| 2015/0300143 A1 | 10/2015 | Al-Nakhli et al. | |
| 2015/0337638 A1 | 11/2015 | Lawrence et al. | |
| 2016/0186548 A1 | 6/2016 | Pantano | |
| 2016/0208161 A1* | 7/2016 | Nguyen | C04B 26/10 |
| 2016/0319182 A1 | 11/2016 | Al-Nakhli et al. | |
| 2017/0037716 A1 | 2/2017 | Kohlik et al. | |
| 2017/0073571 A1 | 3/2017 | Salla et al. | |
| 2017/0130568 A1 | 5/2017 | Al-Nakhli | |
| 2017/0130570 A1 | 5/2017 | Al-Nakhli et al. | |
| 2017/0204713 A1 | 7/2017 | Bell et al. | |
| 2019/0128105 A1 | 5/2019 | Al-Mulhem | |

FOREIGN PATENT DOCUMENTS

| | | |
|---|---|---|
| CN | 105790933 A | 7/2016 |
| GB | 2205340 A | 12/1988 |
| WO | 2013181229 A2 | 12/2013 |
| WO | 2019067393 A1 | 4/2019 |

OTHER PUBLICATIONS

Al-Nakhli et al., "Overcoming Unconventional Gas Challenges by Creating Synthetic Sweetspot and Increasing Drainage Area", SPE 164165, 2013.
Al-Nakhli et al., "Unconventional Gas Stimulation by Creating Synthetic Sweetspot", SPE 163996, 2013.
Al-Umran et al., "Successful Treatments to Enhance the Performance of Horizontal Wells Drilled Near Tar-Mat Areas", IPTC 10188, 2005.
Ayman R. Al-Nakhli et al, 2013; "In-Situ Steam Generation: A New Technology Application for Heavy Oil Production", SPE-184118-MS.
Benedek etl a., "Tar Area Development in a Giant Carbonate Field in Saudi Arabia", SPE-172236-MS, 2014.
Cao et al., "Wettability Alteration of Heavy-Oil/Bitumen Containing Carbonates Using Solvents, high pH Solutions and Nano/Ionic Liquids", OTC-26068-MS, 2015.
Gomaa et al., "New Insights into Hydraulic Fracturing of Shale Formations", Paper IPTC 17594 presented at the Int'l Petroleum Tech Conferences, Doha, Qatar, 2014.
Greff et al. "Catalytic Effects of Nano-Sized Metal Ions in Breaking Asphaltene Molecules During Thermal Recovery of Heavy-Oil", SPE 146604, 2011.
Schlumberger, ACTive PS, Live Production Logging via Fiber Optic Real Time Telemetry Coiled Tubing System.
Seifert et al., "Black Oil, heavy Oil and Tar in One Oil Column Understood by Simple Asphaltene Nanoscience", SPE 161144, 2012.
Shokrlu etl al., "Effects of Nano Sized Metals on Viscosity Reduction of Heavy Oil/Bitumen During Thermal Applications", CSUG/SPE-1375401: , 2010.
Search Report and Written Opinion pertaining to Application No. PCT/US2019/040773 dated Jan. 22, 2020.
Search Report and Written Opinion pertaining to Application No. PCT/US2019/040776 dated Jan. 15, 2020.
Examination and Search Report pertaining to Application No. GC2019-38047 dated Nov. 10, 2020.
Office Action dated Dec. 10, 2020 pertaining to U.S. Appl. No. 16/405,505, filed May 7, 2019, 28 pgs.
Mohammed et al. "Identification of Heavy Oil (Tar Mats) Deposits and Forming Mechanism in the Main Pay of the Zubair Formation in North Rumaila Oil Field, Southern Iraq" International Journal of Mining Science, vol. 5, Issue 1, 2019, pp. 1-10; 2019 (Year: 2019).
Examination Report dated May 31, 2021 pertaining to GCC Application No. GC 2019-38047 filed Aug. 4, 2019.

* cited by examiner

METHODS FOR RECOVERING PETROLEUM BY REDUCING GEOLOGICAL FORMATION BREAK-DOWN PRESSURES

BACKGROUND

Field

The present disclosure relates to natural resource extraction and, more specifically, to methods for recovering petroleum from sub-surface petroleum reservoirs.

Technical Background

Hydraulic fracturing fluids containing proppants are commonly used to enhance productivity from petroleum-bearing reservoir formations such as carbonate, sandstone, shale, bitumen, and gas hydrate formations. During hydraulic fracturing operations, a fracturing treatment fluid is pumped under a pressure and rate sufficient for creating a fracture in the geological formation.

BRIEF SUMMARY

Hydraulic fracturing generally includes fracturing a geological formation that surrounds a petroleum reservoir. In order to adequately fracture the geological formation, a fluid with a pressure at least equal to the break-down pressure of the geological formation is needed. Hydraulic fracturing may be inhibited by relatively high break-down pressures of a geological formation. For example, such relatively high break-down pressures may make hydraulic fracturing more energy and cost burdensome. In some circumstances, the break-down pressure may be so great that hydraulic fracturing cannot be performed by conventional means to fracture the geological formation. As such, methods for reducing the break-down pressure of geological formations are needed so that subsequent hydraulic fracturing may be performed that utilizes lesser fluid pressures than would be necessary if the break-down pressure were not reduced (that is, if the original break-down pressure of the formation was not altered by the methods presently disclosed).

As presently described, the break-down pressure may be reduced by exothermically reacting one or more reaction components within the petroleum reservoir. Such reaction components may be adjacent to or within the rock formation of the reservoir. For example, the reaction components may penetrate the rock formation through pores in the rock, react to cause temperature, pressure, or both, and, thus, reduce the break-down pressure of the formation. The exothermic reaction may be, for example, activated by acidity or temperature. The exothermic reaction may be followed by hydraulic fracturing, which may be performed at reduced pressures due to the reduced break-down pressure of the geological formation caused by the exothermic reaction.

According to one or more embodiments of the present disclosure, a method for recovering petroleum from a sub-surface reservoir may comprise reducing the break-down pressure of a geological formation from an original break-down pressure to a reduced break-down pressure by exothermically reacting one or more reaction components in a carrier fluid adjacent to or within the geological formation. The exothermic reaction may increase the temperature, pressure, or both, of the carrier fluid adjacent to or within the geological formation. The carrier fluid adjacent to or within the geological formation may have a pressure less than the original break-down pressure of the geological formation prior at the start of the exothermic reaction. The method may further comprise forming fractures in the geological formation by hydraulic fracturing the geological formation. The hydraulic fracturing may comprise contacting the geological formation having the reduced break-down pressure with a hydraulic fracturing fluid at a pressure greater than or equal to the reduced break-down pressure.

According to one or more additional embodiments of the present disclosure, a method for recovering petroleum from a sub-surface reservoir may comprise reducing the break-down pressure of a geological formation from an original break-down pressure to a reduced break-down pressure by exothermically reacting one or more reaction components in a carrier fluid adjacent to or within the geological formation. The exothermic reaction may increase the temperature, pressure, or both, of the carrier fluid adjacent to or within the geological formation. The carrier fluid adjacent to or within the geological formation may have a pressure less than the original break-down pressure of the geological formation prior at the start of the exothermic reaction. The method may further comprise forming fractures in the geological formation by hydraulic fracturing the geological formation. The hydraulic fracturing may comprise contacting the geological formation having the reduced break-down pressure with a hydraulic fracturing fluid at a pressure greater than or equal to the reduced break-down pressure. The exothermic reaction may comprise the chemical reaction: $NH_4Cl + NaNO_2 \rightarrow N_2 + NaCl + 2H_2O + heat$.

According to one or more yet additional embodiments of the present disclosure, a method for recovering petroleum from a sub-surface reservoir may comprise reducing the break-down pressure of a geological formation from an original break-down pressure to a reduced break-down pressure by exothermically reacting one or more reaction components in a carrier fluid adjacent to or within the geological formation. The exothermic reaction may increase the temperature, pressure, or both, of the carrier fluid adjacent to or within the geological formation. The carrier fluid adjacent to or within the geological formation may have a pressure less than the original break-down pressure of the geological formation prior at the start of the exothermic reaction. The method may further comprise forming fractures in the geological formation by hydraulic fracturing the geological formation. The hydraulic fracturing may comprise contacting the geological formation having the reduced break-down pressure with a hydraulic fracturing fluid at a pressure greater than or equal to the reduced break-down pressure. The one or more exothermic reaction components may comprise an ammonium-containing compound and a nitrite-containing compound. The exothermic reaction may be activated by an acid precursor.

Additional features and advantages of the technology described in this disclosure will be set forth in the detailed description that follows, and in part will be readily apparent to those skilled in the art from the description or recognized by practicing the technology as described in this disclosure, including the detailed description that follows, the claims, as well as the appended drawings.

BRIEF DESCRIPTION OF THE DRAWINGS

The following detailed description of specific embodiments of the present disclosure can be best understood when read in conjunction with the following drawings, in which.

Reference will now be made in greater detail to various embodiments, some embodiments of which are illustrated in the accompanying drawings. Whenever possible, the same reference numerals will be used throughout the drawings.

DETAILED DESCRIPTION

Described in this disclosure are methods for recovering petroleum from sub-surface reservoirs contained within geological formations. Generally, a geological formation (sometimes referred to presently as a "formation") may at least partially define the bounds of the reservoir containing at least petroleum. For example the reservoir may be a void, at least partially containing petroleum, within a rock formation. "Sub-surface" refers to the position of the reservoir as being below the Earth's surface. This should be understood to include below the surface of both terrestrial and water covered geography. The formation may be made of rock materials such as, without limitation, sedimentary rock, metamorphic rock, or volcanic rock. Such formations may be porous, allowing for chemicals to penetrate into the formation. Petroleum from the reservoir may be accessed by hydraulic fracturing of the formation between a drilled well or other connecting area and the reservoir, as is understood in the technology area pertaining to hydraulic fracturing. As presently described, petroleum may refer to any crude hydrocarbon material such as, without limitation, various grades of crude oil or natural gas. The petroleum may be originally present in a sub-surface reservoir. However, it should be appreciated that the presently described technology may be applicable for the extraction of non-petroleum materials.

According to one or more embodiments presently disclosed, the geological formation may comprise rock compositions that may not favorably respond to conventional hydraulic fracturing processes due to their relatively high break-down pressures. For example, the formation rock (before any treatments) may have a Young's modulus of from 6 Mega pounds per square inch (Mpsi) to 10 Mpsi, or a minimum stress of 0.8 pounds per square inch per foot (psi/ft) to 1.1 psi/ft, or both. These characteristics may result in break-down pressures of the rock that are greater than what can be fractured utilizing conventional hydraulic fracturing processes. As described presently, conventional hydraulic fracturing processes may include any known process for hydraulic fracturing that does not include the presently disclosed reducing of break down pressure prior to hydraulic fracturing. As such, conventional hydrofracturing processes, as presently described, are generally able to fracture formations that have their original (non-reduced) break-down pressure as long as the break-down pressure of the formation is sufficiently small as to allow for conventional hydraulic fracturing. Future discovered hydraulic fracturing processes may also be utilized along with the presently disclosed methods that reduce formation break-down pressure.

In one or more embodiments, subsequent hydraulic fracturing processes may be aided by the reduction of the break-down pressure of the formation. As is described presently, such break-down pressure may be reduced by an exothermic chemical reaction. In such embodiments, the formation may have an original break-down pressure prior to exposure to the exothermic chemical reaction, and a reduced break-down pressure following the exothermic chemical reaction. As presently described, the original break-down pressure refers to the break-down pressure of the formation prior to any process that reduces its break-down pressure.

According to one or more embodiments of the present disclosure, hydraulic fracturing refers to a process in which a fracturing fluid is injected into an isolated segment or interval of the wellbore or other connecting region until it breaks or cracks the surrounding rock. These cracks are called hydraulic fractures. Pressure required to induce a hydraulic fracture is commonly referred to as break-down pressure. Break-down pressure, as presently described, refers to the pressure at which the formation rock will fracture, and where the fracture that is formed allows fluids to flow between the inside of the formation and the area that is fractured such as areas adjacent a bore hole. In one or more embodiments, hydraulic fracturing processes that utilize pressures of at least that of the formation break-down pressure allow for petroleum transport from the reservoir to the surface (such as through the drilled bore). Break-down pressure is also referred to sometimes as "formation break-down pressure" or "fracture initiation pressure."

The reduction of break-down pressure, such as by the methods presently described, allows for the viability of hydraulic fracturing of wells that may have previously been considered too costly to hydraulically fracture due to relatively high break-down pressure of the formation. Reduced break-down pressure refers to the break-down pressure of the formation following the procedures presently described, which reduce the break-down pressure but are generally not sufficient for fracturing a formation to the extent that petroleum can be recovered.

In one or more embodiments, the break-down pressure is reduced by exothermically reacting one or more reaction components. The exothermic reaction may take place in a carrier fluid that may be adjacent to or within the geological formation that will later be subject to hydraulic fracturing. For example, the carrier fluid may be in direct contact with the geological formation that will be hydraulically fractured, and may penetrate pores of the formation to be within the rock formation. The exothermic reaction may release heat, increase pressure, or both, within the rock formation and in the carrier fluid. In one or more embodiments, the exothermic reaction may produce microfractures in the geological formation. Microfractures may refer to relatively small fractures in the formation (for example, only several centimeters (cm) in width or less, such as less than 5 cm, 4 cm, 3 cm, or 2 cm) that do not allow for sustained fluid flow of petroleum through the geological formation and to the surface. Such microfractures will, however, reduce break-down pressure, which may be needed to hydraulically fracture the formation and allow for sufficient petroleum flow for extraction. In additional embodiments, the exothermic reaction may increase the porosity of the geological formation. Such increase in porosity may reduce the break-down pressure and allow for subsequent hydraulic fracturing. In additional embodiments, pressure pulses may form microfractures in the formation due to the exothermic reaction. Pressure pulses may be formed by loading a well with a pressurized fluid in a pulse during a short period of time such that multiple fractures propagate in all directions. The fast expanding pulse generates stress waves that travel through the rock medium creating microfractures in the reservoir.

As such, the fractures formed by the exothermic reaction may vary in size and type. However, as presently described, these fractures generally do not allow for adequate fluid communication between petroleum in a reservoir and the extraction well to allow for surface petroleum production. The fracturing, thus, may reduce the break-down pressure of the formation. However, in one or more embodiments, the pressure of the carrier fluid adjacent to or within the geological formation has a pressure less than the reduced break-down pressure of the geological formation. As such, further processing by hydraulic fracturing may be needed in order to ultimately extract petroleum from the connected extraction well.

In one or more embodiments, the reduction of the break-down pressure may result in a reduction of the average required pumping pressure during subsequent hydraulic fracturing. Additionally or alternatively, the reduced break-down pressure may allow for hydraulic fracturing that would otherwise not be possible due to too great of pressure being exerted on the tube used to transport the fracturing fluid. In additional embodiments, reduced break-down pressure enables the optimization of the required pumping capacity for the hydraulic fracturing execution. For example, in basins with excessive tectonic stresses, the presently disclosed methods can become an enabler to fracture and stimulate well stages that would otherwise be left untreated.

According to one or more embodiments, the temperature, pressure, or both, may be increased in the carrier fluid adjacent to or within the geological formation due to the exothermic reaction. By nature of the reaction being exothermic, heat will be produced and at least local temperature in the carrier fluid may increase. Additionally, pressure may be increased in the carrier fluid by formation of gases by the exothermic reaction. For example, nitrogen gas may be a product of the reaction and cause increased pressure buildup on the geological formation. It is contemplated that temperatures and pressures as great as 600 (degrees Fahrenheit) ° F. and 5000 pounds per square inch (psi), respectively, may be experienced in the carrier fluid. For example, the exothermic reaction may produce temperatures of at least 200° F., at least 300° F., at least 400° F., or even at least 500° F. In additional embodiments, the pressure in the carrier fluid may be at least 2000 psi, at least 3000 psi, at least 4000 psi, at least 6000 psi, at least 10,000 psi, at least 15,000 psi, or even at least 20,000 psi.

In one or more embodiments, the carrier fluid, in which the exothermic reaction may proceed, may comprise one or more exothermic reaction components. As presently described, the one or more exothermic reaction components may refer to any one or more chemicals that can react downhole in an exothermic chemical reaction. The exothermic reaction may be triggered by one or more additional reactants or catalysts, or may be triggered by exposure to a particular temperature. For example, the carrier fluid may further comprise an acid precursor that activates the exothermic reaction.

In one or more embodiments, the exothermic reaction components includes an ammonium-containing compound and a nitrite-containing compound. In some embodiments of the present disclosure, the ammonium-containing compound is $NH_4Cl$ and the nitrite-containing compound is $NaNO_2$. In certain embodiments of the present disclosure, the acid precursor is triacetin.

In embodiments where the carrier fluid includes an acid precursor, the acid precursor may be operable to trigger an exothermic reaction that consumes or converts one or more of the exothermic reaction components. The exothermic reaction component may be operable to generate heat and increased pressure. The acid precursor may be any acid that releases hydrogen ions to trigger the reaction of the one or more exothermic reaction components. Contemplated acid precursors include triacetin (1,2,3-triacetoxypropane), methyl acetate, HCl, and acetic acid. In at least one embodiment, the acid precursor is triacetin. In at least one embodiment, the acid precursor is acetic acid.

In additional embodiments, the one or more exothermic reaction components may include one or more redox reactants (that is, reduction/oxidation reactants) that exothermically react to produce heat and increase pressure. Suitable exothermic reaction components presently contemplated include urea, sodium hypochlorite, ammonium-containing compounds, and nitrite-containing compounds. In at least one embodiment of the present disclosure, the exothermic reaction component includes ammonium-containing compounds. Ammonium-containing compounds may include ammonium chloride, ammonium bromide, ammonium nitrate, ammonium sulfate, ammonium carbonate, and ammonium hydroxide.

In at least one embodiment, the exothermic reaction component may include nitrite-containing compounds. Nitrite-containing compounds include sodium nitrite and potassium nitrite. In at least one embodiment, the exothermic reaction component includes both ammonium-containing compounds and nitrite-containing compounds. In at least one embodiment, the ammonium-containing compound is ammonium chloride, $NH_4Cl$. In at least one embodiment, the nitrite-containing compound is sodium nitrite, $NaNO_2$.

In one or more embodiments of the present disclosure, the exothermic reaction component includes two redox reactants: $NH_4Cl$ and $NaNO_2$, which react according to the following formula:

$$NH_4Cl+NaNO_2 \rightarrow N_2+NaCl+2H_2O+heat$$

In at least one embodiment of the present disclosure, the acid precursor triggers the exothermic reaction component to react by releasing hydrogen ions. In additional embodiments, the exothermic reaction component is triggered by heat. For example, the exothermic reaction may be activated by wellbore temperatures reaching a temperature greater than or equal to 120° F., at which time the reaction of the redox reactants may be triggered. In at least one embodiment, the reaction of the redox reactants is triggered by temperature in the absence of the acid precursor.

In at least one additional embodiment, the exothermic reaction component is triggered by acidic conditions in the carrier fluid following basic conditions. For example, a base may be added to the carrier fluid of the present embodiments to adjust the pH to between 9 and 12. In at least one embodiment, the base is potassium hydroxide. The carrier fluid with the base may be injected adjacent to or within the formation. Following the injection of the carrier fluid, an acid precursor may be injected to lessen the pH. For example, acid precursor may lessen the pH to less than 9, less than 8, less than 7, or even less than 6. In some embodiments, when the pH is less than 6, the reaction of the redox reactants is triggered. The activation pH may also be affected by the temperature. For example, in one or more embodiments, the reaction of the redox reactants may be triggered when the pH is less than 9 and the temperature is greater than or equal to 185° F., when the pH is less than 8 and the temperature is greater than or equal to 150° F., when the pH is less than 7 and the temperature is greater than or equal to 135° F., or even when the pH is less than 6 and the temperature is greater than or equal to 125° F. However, it should be understood that the exact threshold of activation will vary based on the chemical components utilized as the reaction components. In additional embodiments, the reaction may proceed as a slow rate in basic or neutral conditions, but may dramatically accelerate in acidic conditions. For example, the reaction may be sufficient to reduce the break-down pressure of the formation over several hours in neutral or slightly basic conditions, but may sufficiently reduce the break-down pressure in several hours or less in acidic conditions. According to the embodiments presently disclosed, following the reducing of the break-down pressure, fractures are formed in the geological formation by hydraulic fracturing. In general, the hydraulic fracturing may comprise contacting the geological formation having the reduced break-down pressure (caused by the exothermic reaction) with a hydraulic fracturing fluid at a pressure greater than or equal to the reduced break-down pressure. It is believed that following the treatment by exothermic reaction, the formation may be more permeable to the hydraulic fracturing fluid. For example, the hydraulic fracturing fluid may be able to permeate into the microfractures formed by the exothermic reaction to sufficiently fracture the formation to allow for surface petroleum extraction.

In one or more embodiments, hydraulic fracturing fluids containing proppants may be used to enhance productivity from hydrocarbon-bearing reservoir formations, including carbonate, sandstone, shale, bitumen, and gas hydrate formations. During hydraulic fracturing operations, a fracturing treatment fluid may be pumped under a pressure and rate sufficient for cracking the formation of the reservoir and creating a fracture sufficient to enable petroleum to be extracted through the well. Fracturing operations may consist of three main stages including a pad fluid stage, a proppant fluid stage, and an overflush fluid stage.

The pad fluid stage typically consists of pumping a pad fluid into the formation. The pad fluid may be a viscous gelled fluid that initiates and propagates the fractures. The proppant fluid stage may involve pumping a proppant fluid into the fractures of the formation. The proppant fluid may include proppants mixed with a viscous gelled fluid, a visco-elastic surfactant fluid, or polymers, including cross-linked polymers. The proppant fluid may alternatively be a Newtonian fluid, such as a water based fluid sometimes referred to as "slickwater." In such embodiments, the proppant fluid may include one or more of friction reducers (such as polyacrylamide), biocides (such as methanol or naphthalene), surfactants (such as butanol or ethylene glycol monobutyl ether), or scale inhibitors (such as hydrochloric acid or ethylene glycol). The proppants in the proppant fluid may be lodged in the fractures and create conductive fractures through which hydrocarbons flow. The overflush stage may include pumping a viscous, gelled fluid into the fractures to ensure the proppant fluid is pushed inside the fractures. While the three stages have different aims, all three may utilize viscous fluids, in addition to or alternative to gelled fluids, to achieve those aims.

In one or more embodiments, the carrier fluid containing the one or more exothermic reaction components may be injected adjacent to or within the formation prior to the use of the pad fluid. For example, the carrier fluid may be a brine or other flushing fluid.

In additional embodiments, the carrier fluid may be the pad fluid utilized in the hydraulic fracturing process. For example, the exothermic reaction components may be mixed into the pad fluid. The exothermic reaction may progress and reduce the break-down pressure prior to the commencement of the hydraulic fracturing procedure.

According to additional embodiments, other time release mechanisms may be utilized to contact the one or more reaction components with one another or with an acid. For example, one or more of the reaction components or acids may be encapsulated such that they may be released into solution at a desired time.

EXAMPLES

The one or more examples presently provided should not be considered as limiting on the disclosed and presently claimed embodiments.

Example 1

Exothermic reaction components consisting of Reagent A and Reagent B were injected into a downhole reservoir. Reagent A was a solution of 13,165 kilograms (kg) of sodium nitrate ($NaNO_2$) in 200 barrels (bbl) of water. Reagent B was a solution of 1,030 kg of ammonium chloride ($NH_4Cl$), 1,260 gallons (gal) of acetic acid, and 38 gal of a corrosion inhibitor including formic acid (commercially available as Organic Acid Inhibitor A272 from Schlumberger), in 200 bbl of water. The injection of the exothermic reaction components was carried out in two stages. During Stage 1, 133 bbl of Reagent B was injected into the downhole reservoir through the annulus at a rate of 2.2 barrels per minute (bpm), and 54 bbl of Reagent A was injected into the downhole reservoir through a coiled tubing at a rate of 0.8 bpm. During Stage 2, 67 bbl of Reagent B was injected into the downhole reservoir through the annulus at a rate of 1.5 bpm, and 146 bbl of Reagent A was injected into the downhole reservoir through the coiled tubing at a rate of 1.5 bpm. The identical pump rates of the exothermic reaction components during Stage 2 allowed for "squeezing" of the exothermic reaction components from the annulus and coiled tubing, meaning the maximum amount of exothermic reaction components was transferred from the annulus and coiled tubing to the reservoir.

Figure 1:
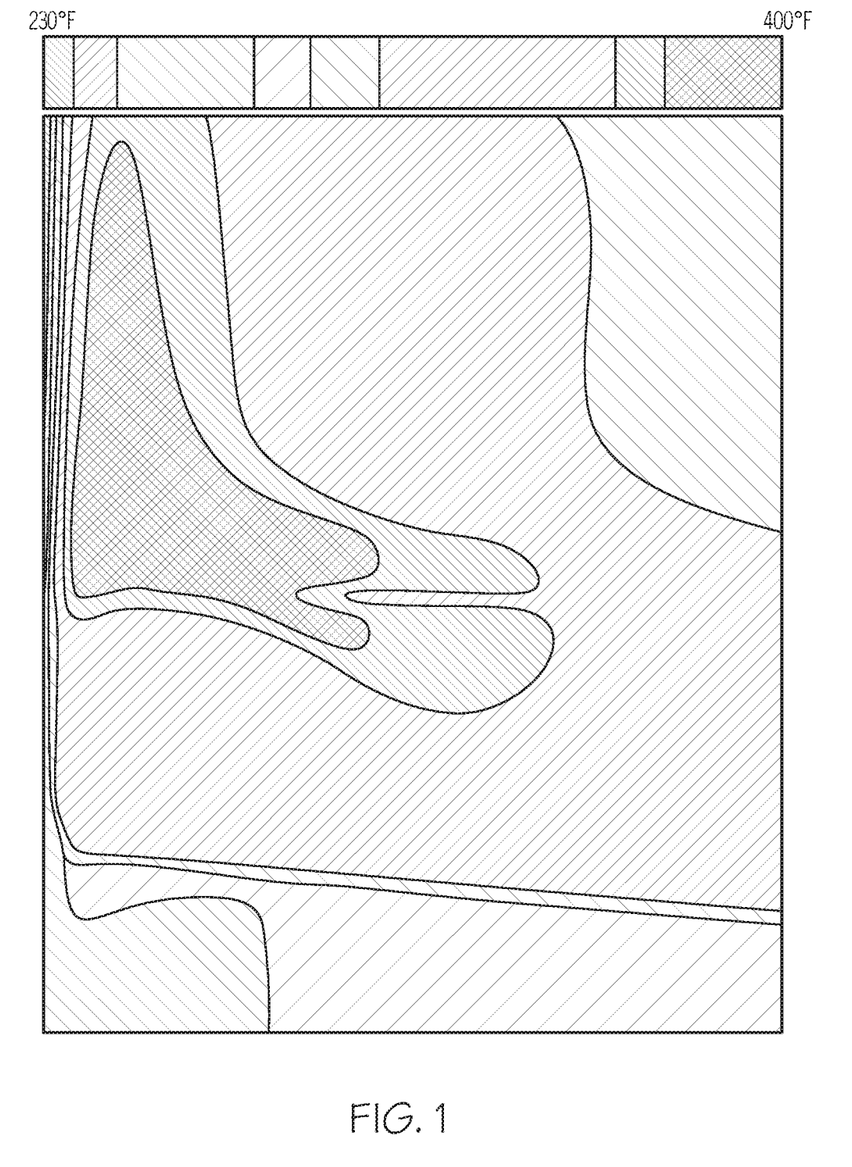
FIG. 1 depicts temperature data for a downhole region that has been subjected to an exothermic reaction, according to one or more embodiments presently described.

After injection, ACTIVE Coiled Tubing, commercially available from Schlumberger, was used to collect distributed temperature sensing (DTS) measurements within the reservoir during the exothermic reaction between Reagent A and Reagent B. FIG. 1 graphically depicts temperature of the fluids in the borehole and fluidly connected regions at a point during the reaction. The downhole region was approximately 230° F. prior to the injection of the exothermic reaction components. Upon injection of the exothermic reaction components, the $NaNO_2$ of Reagent A and the $NH_4Cl$ of Reagent B reacted to generate heat within the downhole regions. As shown in FIG. 1, the reactions of the exothermic reaction components resulted in greatly increased temperatures within portions of the borehole and connected regions, to approximately 450° F. Further, the temperatures of some parts of the formation were increased by at least approximately 100° F. That is, the reaction of $NaNO_2$ and $NH_4Cl$ resulted in a substantial temperature increase within downhole regions.

Example 2

Figure 2:
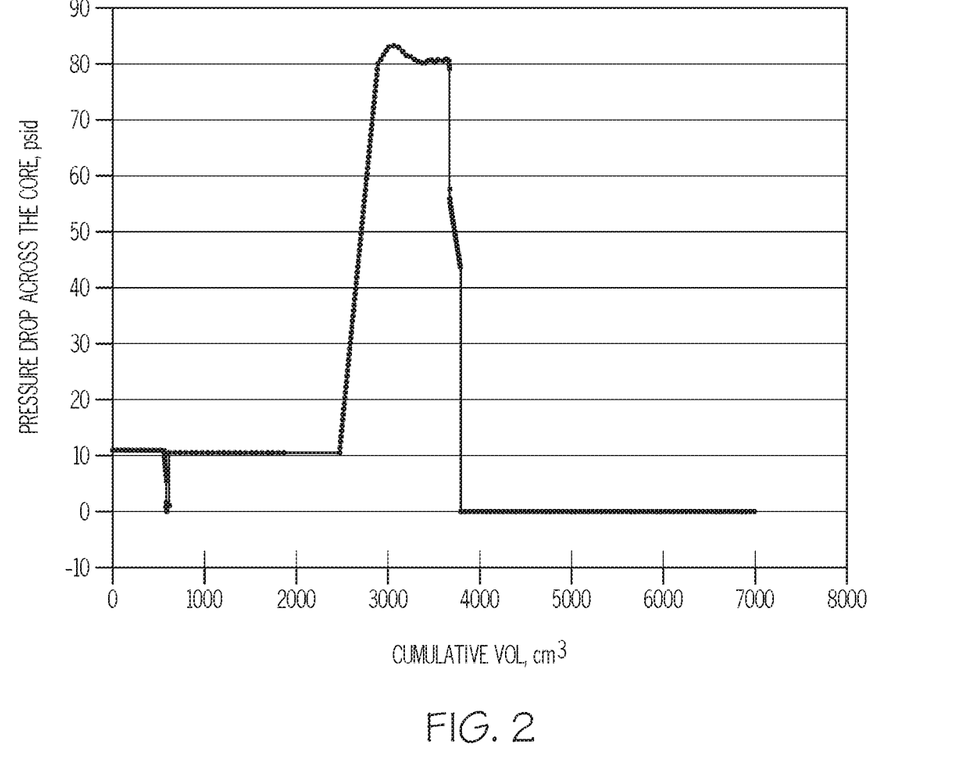
FIG. 2 graphically depicts the relationship between pressure drop (y-axis) and cumulative volume (x-axis) during a coreflood experiment in which a core sample was injected with a reactant solution, according to one or more embodiments presently described.

Example exothermic reactions were conducted on a core sample using a coreflooding system available from Core Laboratories. FIG. 2 shows the pressure drop across the core sample as a function of the cumulative volume of fluid injected into the core sample throughout the experiment. To begin the experiment, brine was injected into the core sample at a rate of 1 cubic centimeter per minute ($cm^3$/min) and the brine permeability of the core sample was measured and determined to be 0.45 miliDarcys (mD). Then, approximately 5 to 10 total pore volume of a reactant solution including sodium nitrite and ammonium chloride was injected into the core sample, which resulted in a pressure drop across the core of approximately 800 pounds per square inch differential (psid). Then, brine was injected into the core sample a second time, again at a rate of 1 $cm^3$/min. Pressure drop across the core greatly increased during the reactant solution injection, confirming the generation of pressure. The brine permeability of the core sample was increased from 0.45 mD to 118.47 mD, an increase of 118.02 mD. The porosity of the core sample was increased from 0.7% to 2.7%, an increase of 2% total porosity. In other words, the initial porosity of the core sample was increased by 286%. Permeability and porosity were greatly improved, micro-fractures were created, and conductivity was increased throughout the core sample. This experiment was again run on a core sample with an initial porosity of 13.22%. After treatment, the porosity of the core sample was increased from 13.22% to 14.2%, an increase of 1% total porosity. As such, the initial porosity of the core sample was increased by 7.5%.

Example 3

A core sample with an air permeability of 0.005 nanoDarcys was chemically treated using a coreflooding system available from Core Laboratories. A solution including sodium nitrite and ammonium chloride was injected through a 0.5 inch diameter drilled hole within the core sample. The diameter of the core sample was 1.5 inches, the total core sample length was 3.2 inches, and the core sample had an initial porosity of 1.35%. Due to the reactant solution, micro-fractures were created along the core sample.

MR-CT Microscopy utilizes nuclear magnetic resonance (NMR) combined with X-ray computed tomography to measure the pore size distribution of a core sample. NMR allows observing microscopic events within reservoir porous media, such as core samples, and provides fluid-rock interaction with proper mineralogy quantification information. Estimates of permeability can be obtained by using NMR data along with empirical correlations. Water within a rock contains protons that have a net magnetic moment and spin. When subjected to the NMR static magnetic field, $B_o$, these protons align parallel to the applied field. When the protons are tipped at 90° to $B_o$, they attempt to realign with $B_o$ with a speed, or relaxation time, that is proportional to the size of the cavity, or pore, in which the protons are located. An NMR machine comprises permanent magnets, also referred to as pole pieces, a radio frequency transmitter, and a radio frequency receiver and amplifier. The static magnetic field is generated by the pole pieces. Pulsing the radio frequency transmitted induces an orthogonal field. The return of the oriented protons to the original field is detected by the receiver coil. The entire assembly is housed in a temperature controlled enclosure, and the core sample is conventionally placed in the most uniform portion of the static magnetic field. Pulsing the transmitter coil applies a secondary magnetic field, $B_t$, perpendicular to the $B_o$ static magnetic field. Sufficient pulse duration causes the protons to tip in a direction 90 degrees (°) to $B_o$ in the $B_t$ or transverse direction. When the pulse is removed, the protons begin to precess. Precession is a change in the orientation of the rotational axis of a rotating body. A series of 180° pulses are used to realign the precessing protons; however, the pulse cannot align those protons that are out of the plane or that have relaxed. Brownian motion and surface relaxation cause the protons to fall from the plane or become relaxed through contact with a mineral surface. Thus, subsequent realignment pulses result in a gradually reduced realigned strength. As fewer and fewer protons realign, the signal strength decays in the $B_t$ direction. It can be shown that diffusion and Brownian motion result in a decay that is slow compared to surface relativity. Measurement times take seconds. In that time, water molecules diffuse. The distance traveled by a water molecule in 1 second can be computed from:

$$x_2 = 6Dt \qquad \text{EQUATION 1}$$

where D is the molecular diffusion constant for water: $D=2\times10^{-5}$ $cm^2$/sec. Therefore, the likelihood of a proton coming in contact with a mineral surface increases as the cavities become smaller. Thus, water in small cavities has a shorter relaxation time than water in large cavities. When surface relativity dominates, the rate of signal decay is inversely proportional to the size of the cavity, or pore, in which the protons reside. Large signals at very short times are interpreted as coming from small pores. The recorded signal, a relaxation curve, is interpreted as the sum of a series of relaxation time calculated by:

$$\frac{1}{T_2} = \frac{\rho_r}{a} \qquad \text{EQUATION 2}$$

where $T_2$ is the relaxation time, $\rho_r$ is the surface relativity, a property dependent upon mineralogy, and a is a characteristic dimension of the pore, typically taken as r, the radius. Thus, for a monomineralic rock, the relaxation time of a fluid in a spherical pore is proportional to 1/r, where r is the radius of the pore. The amplitude of each individual relaxation time is associated with the volume associated with cavity, or pore. The ensemble of amplitudes plotted against $T_2$ relaxation time is a $T_2$ relaxation spectrum. The spectrum is a reflection of the variation of pore sizes. The sum of the amplitudes, or incremental porosities, is the sum of fluid in the rock, which, when the core sample is 100% saturated with water, represents the porosity of the core sample.

Figure 3:
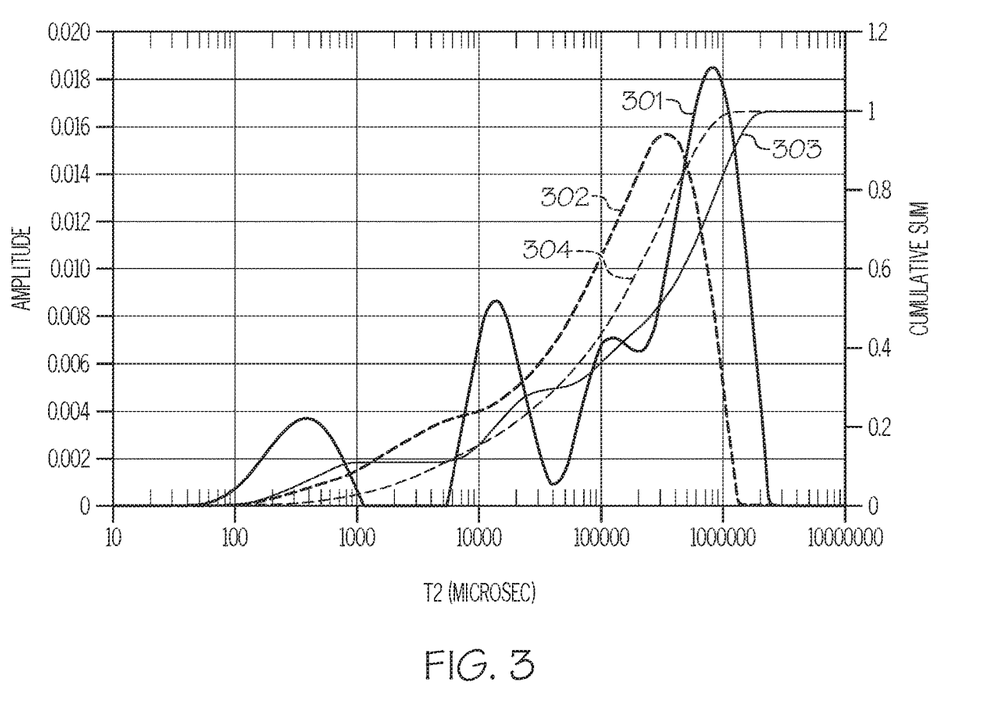
FIG. 3 graphically depicts the pore size distribution and the cumulative pore size of a core sample before and after a coreflood experiment in which a core sample was injected with a reactant solution, according to one or more embodiments presently described.

In this experiment, MR-CT Microscopy was performed on a core sample before and after the simulated downhole exothermic reaction condensate treatment. The exothermic reaction treatment led to the initiation of micro-cracks and pores in the rock samples. Referring to FIG. 3, the $T_2$ relaxation curve is plotted, with the $T_2$ relaxation time shown in microseconds (μsec) on the x-axis, the amplitude (relating to lines 301 and 302) shown on the left y-axis, and the cumulative sum of the amplitudes (relating to lines 303 and 304) shown on the right y-axis. Line 301 represents the pore size distribution before the treatment, and line 302 represents the pore size distribution after the treatment. Line 301 shows three peaks with different pore size distribution, micro pores (100 to 1000 μsec), miso pores (10,000 to 100,000 μsec) and macro pores (100,000 to 1,000,000 μsec). These separated peaks indicate isolated porosity between the three sizes of pores. After treatment, as shown in line 302, only one large peak is shown, indicating that communication between the different pore sizes has increased, leading to greater conductivity within the core sample after the treatment.

Line 303 represents the cumulative amplitude, or pore size, before the treatment, and line 304 represents the cumulative amplitude, or pore size, after the treatment. Line 304 is shifted to the left in comparison to line 303, indicating that the treatment created micro fractures, thereby changing the pore system geometry, leading to greater conductivity within the core sample after treatment. Therefore, the treatment enhanced the fluid communication between the different pore sizes within the core sample, thereby improving the absolute permeability of the core sample. A visual inspection of the X-ray computed tomography images before and after the treatment showed a visual increase in the porosity and permeability of the core sample.

Example 4

Figure 4:
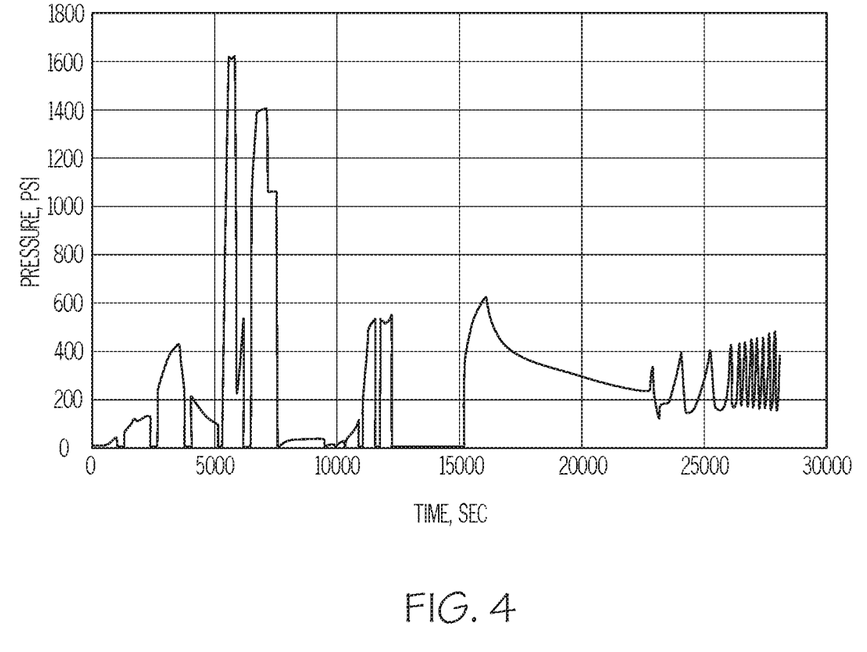
FIG. 4 graphically depicts pressure versus time in seconds (sec) of an exothermic reaction, according to one or more embodiments presently described.

A core plug sample of Scioto sandstone was saturated with solutions including sodium nitrite and ammonium chloride. 80 milliliters (mL) of Solution 1 including sodium nitrite and 80 mL of Solution 2 including ammonium chloride were placed in separate transfer cells. The solutions were then injected simultaneously through separate lines into a cell containing the core plug sample at a rate of approximately 1 to 2 milliliters per minute (mL/min). The outlet valve of the cell was monitored until approximately 10 mL of solution was collected in order to ensure that the core sample plug was fully saturated with solution. Once the core plug sample was fully saturated, the inlet and outlet valves of the cell were closed and an initial confining pressure of 1,000 pounds per square inch (psi) was applied within the cell. The cell was then heated to 100° C., triggering the reaction between the sodium nitrite and the ammonium chloride. During the reaction, the pressure and temperature were continuously recorded. The pressure increased within the cell at a rate of approximately 2 pounds per square inch per minute (psi/min) before sharply increasing to over 1,000 psi. FIG. 4 shows the pressure generated within the cell during the reaction. Once the reaction was completed and no further fluctuation in pressure was observed, the final pressure and temperature were recorded. The core plug sample was removed from the cell and cleaned with toluene and alcohol.

The pore size and spatial distribution of the pore size within the core plug sample were analysed before and after the reaction using standard NMR equipment, commercially available as GeoSpec 2/75 from Oxford Instruments. Prior to the analysis, the core plug sample was saturated with 3% KCl solution. The results of the analysis are reported in Table 1, where the volume is represented in cubic centimeters (cc).

TABLE 1

NMR Analysis of Scioto Sandstone Before and After Reaction

| | Weight (g) | Length (cm) | Diameter (cm) | Bulk Volume (cm³) | Grain Volume (cm³) | Pore Volume (cm³) | Porosity (%) | Permeability (mD) |
|---|---|---|---|---|---|---|---|---|
| Before Reaction | 134.622 | 5.179 | 3.789 | 58.374 | 50.307 | 8.067 | 13.82 | 1.096 |
| After Reaction | 135.121 | 5.179 | 3.789 | 58.374 | 49.91 | 8.464 | 14.50 | 1.208 |

As shown by Table 1, porosity increased by 5% and permeability increased by 10% after the core plug sample was subjected to the reaction within the cell. That is, the reaction of ammonium chloride and sodium nitrite in the presence of Scioto sandstone resulted in increased pore volume, porosity, and permeability within the sandstone.

Figure 5:
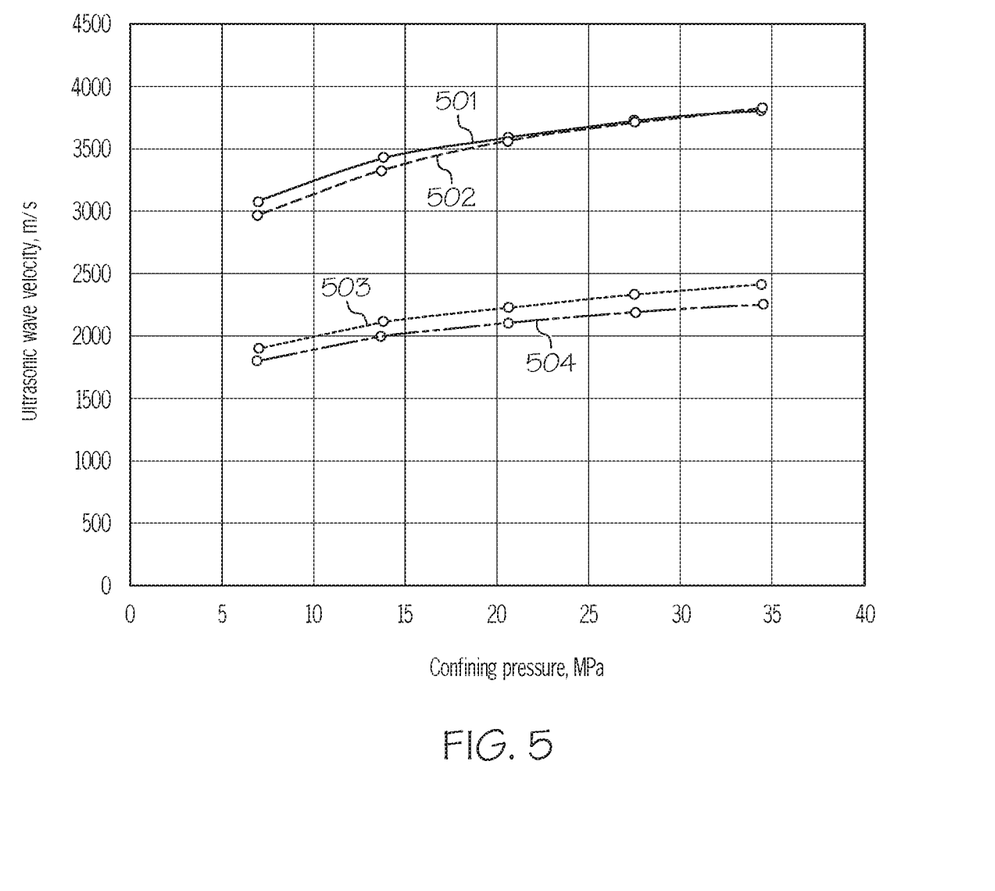
FIG. 5 graphically depicts confining pressure in megaPascals (MPa) versus ultrasonic wave velocity in meters per second (m/s) of a geological sample, according to one or more embodiments presently described.

Ultrasonic compressional and shear wave velocities were measured at various confining pressures of the core plug sample within a tri-axial compression testing machine. These measurements were collected before and after exposure of the core plug sample to the reaction. FIG. 5 shows the change in the ultrasonic compressional and shear wave velocities before and after the reaction. Line 501 represents the ultrasonic compressional wave velocity (Vp) before the reaction of the core plug sample within the cell. Line 502 represents the Vp after the reaction of the core plug sample within the cell. As shown by a comparison of line 501 and line 502, the reaction of ammonium chloride and sodium nitrite within the cell only slightly affected the compressional velocity. This change may likely be attributed to the increase in porosity of the core sample plug after the reaction, as shown in Table 1. Line 503 represents the ultrasonic shear wave velocity (Vs) before the reaction of the core plug sample within the cell. Line 504 represents the Vs after the reaction of the core plug sample within the cell. As shown by a comparison of line 503 and line 504, the reaction of ammonium chloride and sodium nitrite within the cell resulted in a noticeable change in the shear velocity. This change may likely be attributed to the presence of fractures formed within the core plug sample as a result of the reaction.

Figure 6:
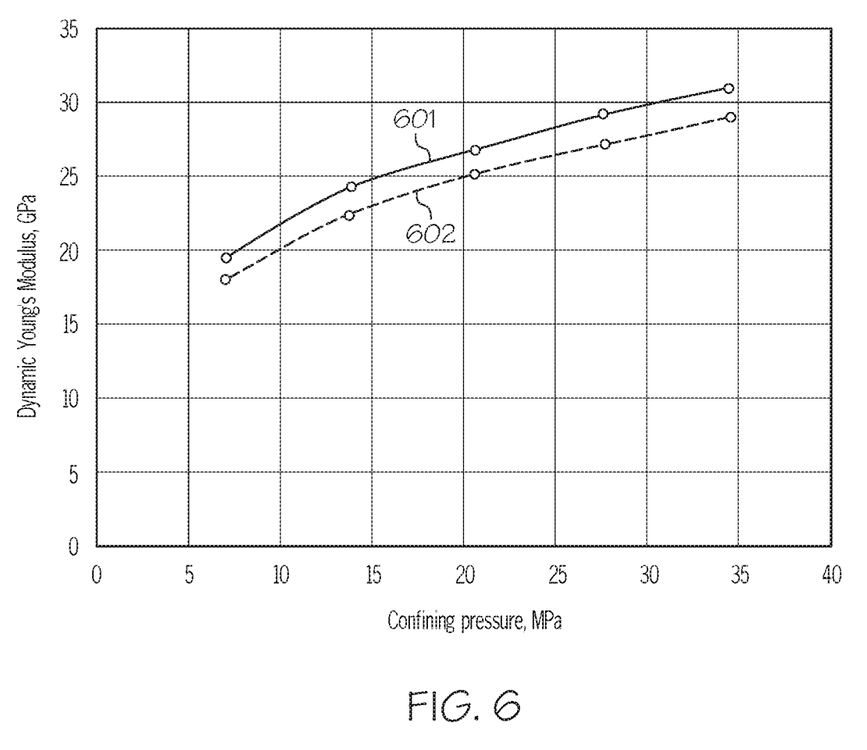
FIG. 6 graphically depicts Young's modulus in gigaPascals (GPa) versus confining pressure of a geological sample, according to one or more embodiments presently described.

The measured ultrasonic compressional and shear wave velocities were then used to calculate the dynamic Young's modulus and the dynamic Poisson's ratio at the various confining pressures before and after the reaction. FIG. 6 shows the change in the dynamic Young's modulus before and after the reaction. Line 601 represents the dynamic Young's modulus before the reaction of the core plug sample within the cell. Line 602 represents the dynamic Young's modulus after the reaction of the core plug sample within the cell. As shown by a comparison of line 601 and line 602, the reaction of ammonium chloride and sodium nitrite within the cell resulted in a decrease in the dynamic Young's modulus. This may indicate a reduced amount of stress necessary to deform a formation that has been exposed to the reaction and, as such, a reduced break-down pressure.

Figure 7:
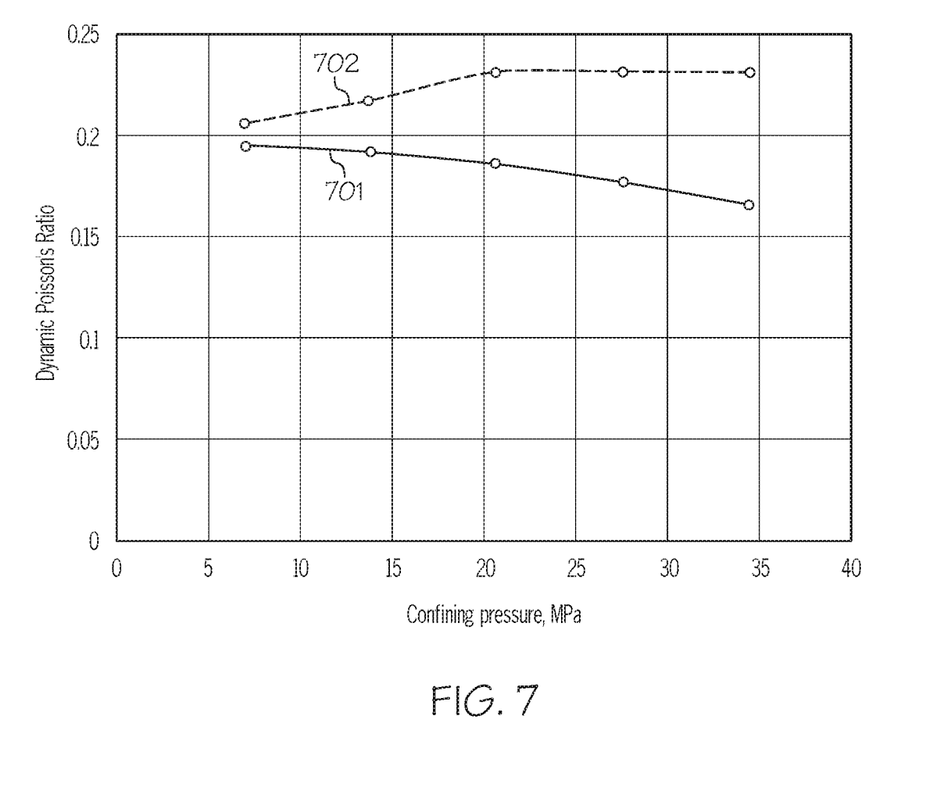
FIG. 7 graphically depicts Poisson's ratio versus confining pressure of a geological sample, according to one or more embodiments presently described.

FIG. 7 shows the change in the dynamic Poisson's ratio before and after the reaction. Line 701 represents the dynamic Poisson's ratio before the reaction of the core plug sample within the cell. Line 702 represents the dynamic Poisson's ratio after the reaction of the core plug sample within the cell. As shown by a comparison of curve 701 and Line 702, the reaction of ammonium chloride and sodium nitrite within the cell resulted in a substantial increase in the dynamic Poisson's ratio. This may indicate greater deformation of a formation that has been exposed to the reaction and, as such, a reduced break-down pressure.

Example 5

A core plug sample of Berea sandstone was supplied and subjected to a reaction of ammonium chloride and sodium nitrite in a similar manner as that described in Example 4. After being removed from the cell and washed, the core plug sample was scanned using a three-dimensional, non-destructive Macro-CT Scanner, commercially available as Alexion TSX-032A from Toshiba. The core plug sample was scanned with a spatial resolution of 1 millimeter (mm) in order to identify any major fractures or wormholes that may have been present inside the sample. The scans displayed the presence of micro-scale fractures along the edge of the core plug sample as well as macro-scale fractures along the longitudinal axis. Many of the macro-scale fractures extended approximately 0.5 mm to 1.0 mm deep within the core plug sample.

The core plug sample was further tested for porosity and permeability. The pore size and spatial distribution of the pore size within the core plug sample was also analysed before and after the reaction using standard NMR equipment, commercially available as GeoSpec 2/75 from Oxford Instruments. Prior to the analysis, the core plug sample was saturated with 3% KCl solution. The results of the analysis are reported in Table 2.

TABLE 2

NMR Analysis of Berea Sandstone Before and After Reaction

| | Weight (g) | Length (cm) | Diameter (cm) | Porosity (%) | Permeability (mD) |
|---|---|---|---|---|---|
| Before Reaction | 179.974 | 7.702 | 3.796 | 20.82 | 163.260 |
| After Reaction | 179.974 | 7.702 | 3.796 | 21.36 | 192.170 |

As shown by Table 2, porosity increased by 2.5% and permeability increased by 17.7% after the core plug sample was subjected to the reaction within the cell. That is, the reaction of ammonium chloride and sodium nitrite in the presence of Berea sandstone resulted in increased porosity and permeability within the sandstone.

Example 6

Figure 8:
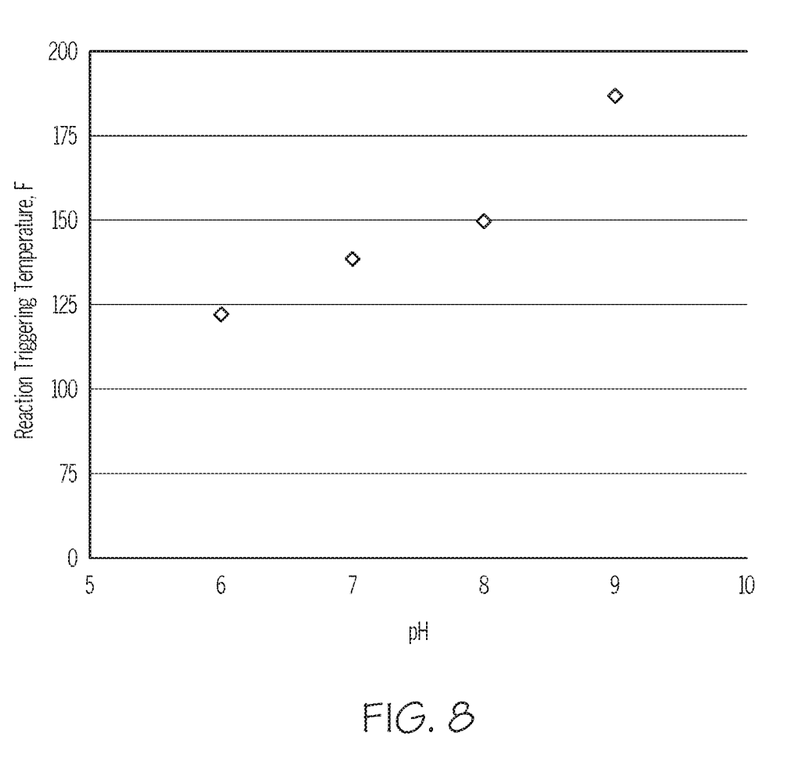
FIG. 8 graphically depicts the relationship between the pH of the exothermic reaction components and the temperature required to trigger the exothermic reaction, according to one or more embodiments presently described.

Example exothermic reactions were conducted to determine the relationship between the pH and the temperature necessary to trigger a reaction of the exothermic reaction components. Four solutions of the exothermic reaction components were prepared. The first solution had a pH of approximately 6, the second solution had a pH of approximately 7, the third solution had a pH of approximately 8, and the fourth solution had a pH of approximately 9. The four solutions were placed in a reaction cell set at an initial pressure of 500 psi and gradually heated from room temperature until the exothermic reaction was triggered. The temperature at which the exothermic reaction of each solution triggered was then recorded. The results are graphically depicted in FIG. 8. These results indicate that the pH needed to trigger the reaction may, in at least some embodiments, be dependent on the temperature at the place of reaction, such as a downhole region.

It is noted that one or more of the following claims utilize the term "where" as a transitional phrase. For the purposes of defining the presently disclosed embodiments, it is noted that this term is introduced in the claims as an open-ended transitional phrase that is used to introduce a recitation of a series of characteristics of the structure and should be interpreted in like manner as the more commonly used open-ended preamble term "comprising."

It will be apparent to those skilled in the art that various modifications and variations can be made to the presently disclosed embodiments without departing from the spirit and scope of the presently disclosed embodiments. Since modifications combinations, sub-combinations and variations of the disclosed embodiments incorporating the spirit and substance of the presently disclosed embodiments may occur to persons skilled in the art, the presently disclosed embodiments should be construed to include everything within the scope of the appended claims and their equivalents.

What is claimed is:

1. A method for recovering petroleum from a sub-surface reservoir, the method comprising:
reducing the break-down pressure of a geological formation from an original break-down pressure to a reduced break-down pressure by exothermically reacting one or more reaction components in a carrier fluid adjacent to or within the geological formation, where the exothermic reaction increases the temperature, pressure, or both of the carrier fluid adjacent to or within the geological formation, and where carrier fluid adjacent to or within the geological formation has a pressure less than the original break-down pressure of the geological formation prior to the start of the exothermic reaction;
and forming fractures in the geological formation by hydraulic fracturing the geological formation, the hydraulic fracturing comprising contacting the geological formation having the reduced break-down pressure with a hydraulic fracturing fluid at a pressure greater than or equal to the reduced break-down pressure,
wherein the one or more exothermic reaction components comprises an ammonium-containing compound and a nitrite-containing compound,
wherein the ammonium-containing compound comprises $NH_4Cl$ and the nitrite-containing compound comprises $NaNO_2$.

2. The method of claim 1, where the exothermic reaction forms microfractures in the geological formation, increases the porosity of the geological formation, or both.

3. The method of claim 1, where at least a portion of the reaction components that undergo the exothermic reaction penetrate pores of the geological formation.

4. The method of claim 1, where the exothermic reaction is activated by an acid precursor, the acid precursor selected from the group consisting of triacetin, methyl acetate, hydrochloric acid, acetic acid, and combinations of these.

5. The method of claim 1, where the exothermic reaction is activated by heat.

6. The method of claim 1, where the carrier fluid is a flushing fluid.

7. The method of claim 1, where the carrier fluid is a pad fluid used in the hydraulic fracturing.

8. The method of claim 1, where the formation has a Young's modulus of at least 6 Mpsi.

9. The method of claim 1, where gas is released by the exothermic reaction.

10. A method for recovering petroleum from a sub-surface reservoir, the method comprising:

reducing the break-down pressure of a geological formation from an original break-down pressure to a reduced break-down pressure by exothermically reacting one or more reaction components in a carrier fluid adjacent to or within the geological formation, where the exothermic reaction increases the temperature, pressure, or both of the carrier fluid adjacent to or within the geological formation, and where the carrier fluid adjacent to or within the geological formation has a pressure less than the original break-down pressure of the geological formation prior to the start of the exothermic reaction; and forming fractures in the geological formation by hydraulic fracturing the geological formation, the hydraulic fracturing comprising contacting the geological formation having the reduced break-down pressure with a hydraulic fracturing fluid at a pressure greater than or equal to the reduced break-down pressure;

where the exothermic reaction comprises the chemical reaction:

$NH_4Cl + NaNO_2 \rightarrow N_2 + NaCl + 2H_2O + heat.$

11. The method of claim 10, where the exothermic reaction forms microfractures in the geological formation, increases the porosity of the geological formation, or both.

12. The method of claim 10, where at least a portion of the reaction components that undergo the exothermic reaction penetrate pores of the geological formation.

13. The method of claim 10, where the carrier fluid is a flushing fluid.

14. The method of claim 10, where the carrier first fluid is a pad fluid used in the hydraulic fracturing.

15. The method of claim 10, where the formation has a Young's modulus of at least 6 Mpsi.

16. A method for recovering petroleum from a sub-surface reservoir, the method comprising:

reducing the break-down pressure of a geological formation from an original break-down pressure to a reduced break-down pressure by exothermically reacting one or more reaction components in a carrier fluid adjacent to or within the geological formation, where the exothermic reaction increases the temperature, pressure, or both of the carrier fluid adjacent to or within the geological formation, and where the carrier fluid adjacent to or within the geological formation has a pressure less than the original break-down pressure of the geological formation prior to the start of the exothermic reaction; and forming fractures in the geological formation by hydraulic fracturing the geological formation, the hydraulic fracturing comprising contacting the geological formation having the reduced break-down pressure with a hydraulic fracturing fluid at a pressure greater than or equal to the reduced break-down pressure;

where the one or more exothermic reaction components comprise an ammonium-containing compound and a nitrite-containing compound; and where the exothermic reaction is activated by an acid precursor, and wherein the ammonium-containing compound comprises $NH_4Cl$ and the nitrite-containing compound comprises $NaNO_2$.

17. The method of claim 16, where the acid precursor is selected from the group consisting of triacetin, methyl acetate, hydrochloric acid, acetic acid, and combinations of these.

* * * * *